May 8, 1928. 1,668,924
J. C. SCHAFFER
LIME HYDRATING APPARATUS
Filed April 17, 1923 3 Sheets-Sheet 1

John C. Schaffer
INVENTOR
BY
Geo E Kirk
ATTORNEY

May 8, 1928.
J. C. SCHAFFER
1,668,924
LIME HYDRATING APPARATUS
Filed April 17, 1923 3 Sheets-Sheet 2
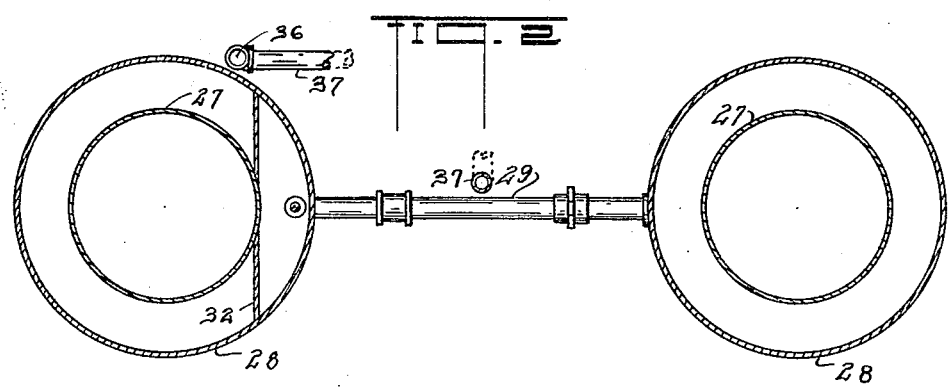
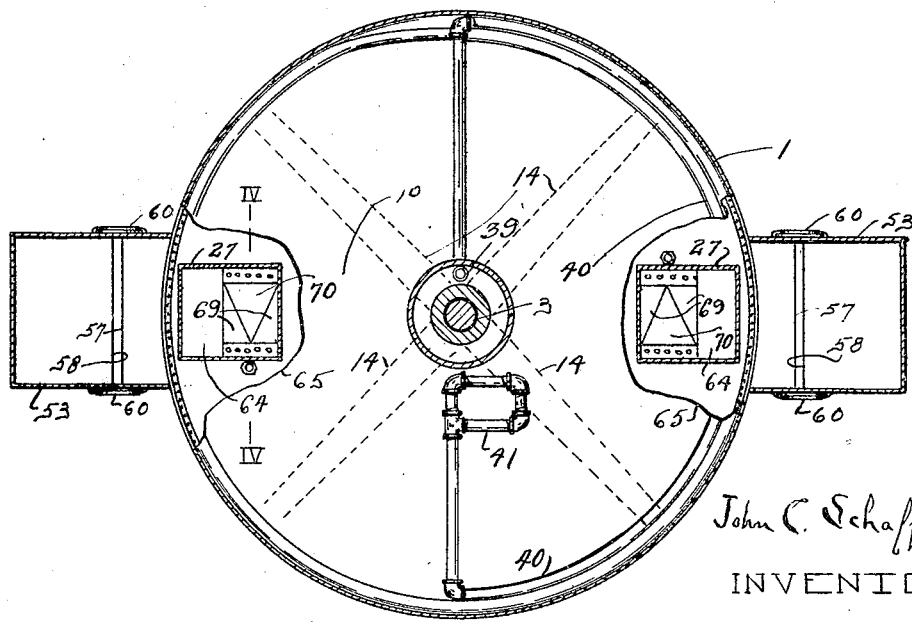
John C. Schaffer
INVENTOR
BY
ATTORNEY

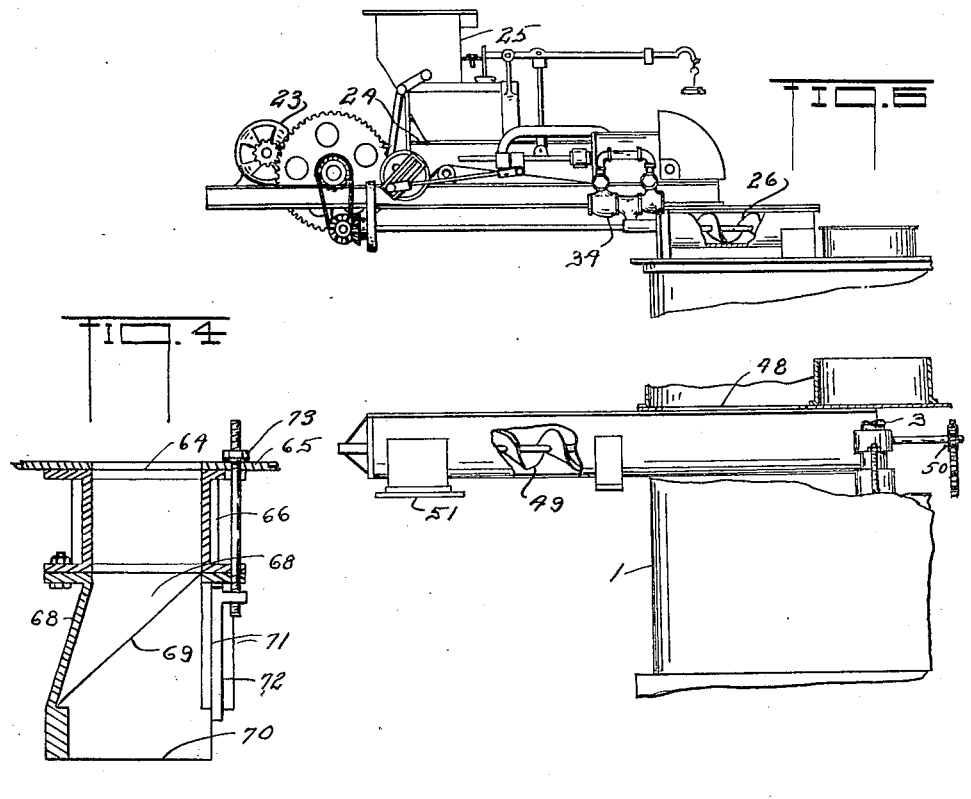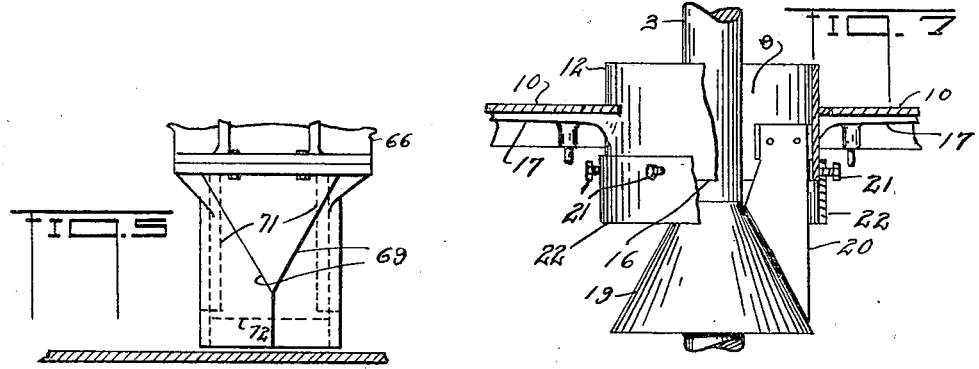

Patented May 8, 1928.

1,668,924

UNITED STATES PATENT OFFICE.

JOHN C. SCHAFFER, OF PITTSBURGH, PENNSYLVANIA, ASSIGNOR TO SCHAFFER POIDOMETER COMPANY, OF PITTSBURGH, PENNSYLVANIA, A CORPORATION OF PENNSYLVANIA.

LIME-HYDRATING APPARATUS.

Application filed April 17, 1923. Serial No. 632,746.

This invention relates to the treatment of material, more especially for the incorporation of moisture therewith.

This invention has utility in the addition of moisture to alkaline earth materials of quick or semi-quick characteristics.

Referring to the drawings:—

Fig. 2 is a section on the line II—II, Fig. 1;

Fig. 3 is a plan view of the hydrator of Fig. 1, parts being broken away;

Fig. 4 is a section on the line IV—IV, Fig. 3, showing the sealing shoe or valve device for delivering precipitate from the stack back to the hydrator;

Fig. 5 is a detail view, with parts broken away of the valve device of Fig. 4;

Fig. 6 is a fragmentary view of the hydrator of Fig. 1, from the left, showing the supply and delivery devices; and Fig. 7 is a detail view of the adjustable collar or flow control valve between the platform separated chambers of the hydrator.

Figure 1:
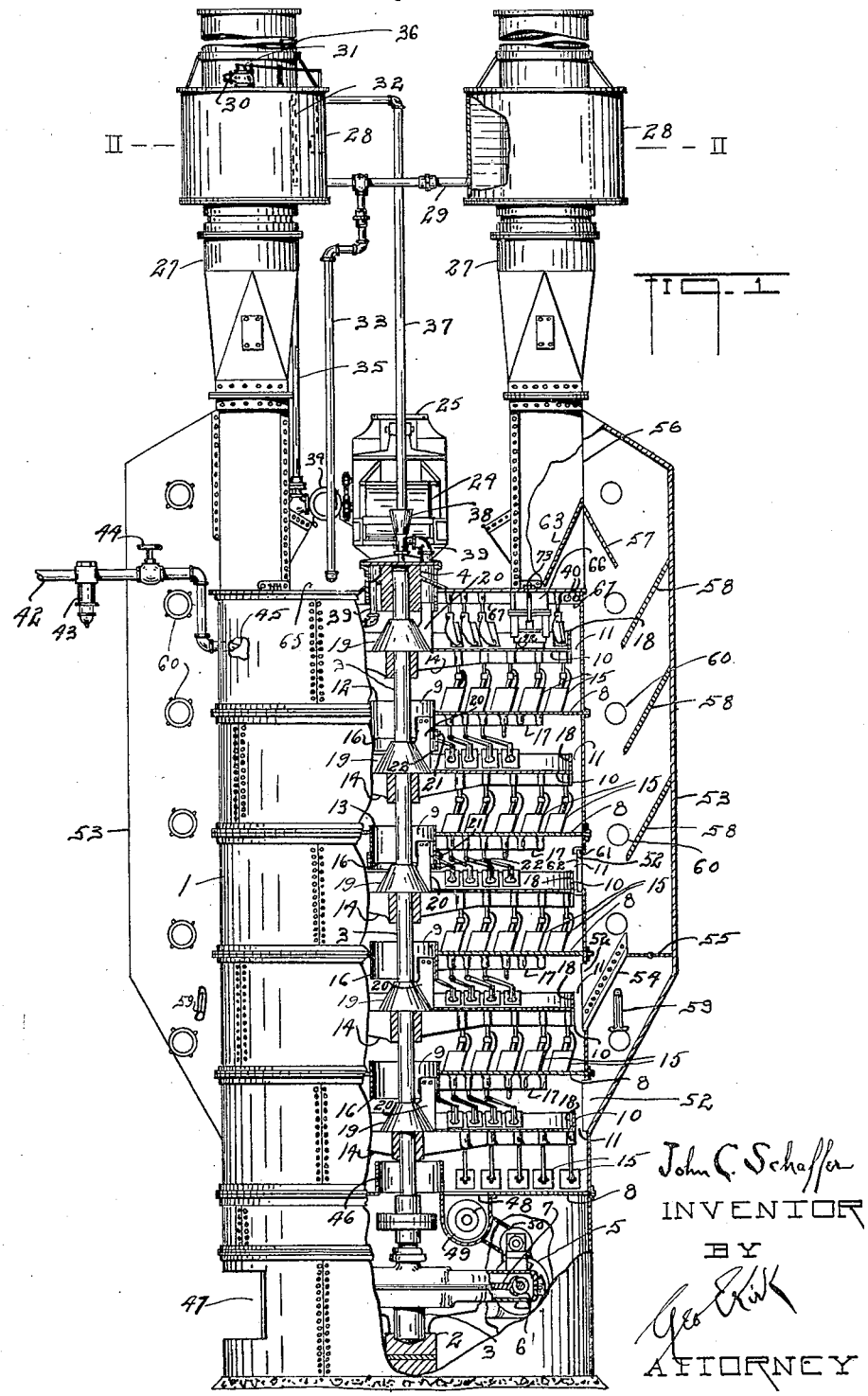
Fig. 1 is a side elevation of a hydrator disclosing features in accordance with and for facilitating the carrying out of the invention as to an embodiment thereof, parts being broken away.

Upright cylindrical shell or housing 1 has centrally therein a step bearing 2 for vertical shaft 3 held axially of the housing 1 by upper lateral bearing 4. Motor 5 is connected to drive worm 6 in mesh with worm wheel 7 for rotating the hydrator shaft 3. This housing 1 carries one series of superposed platforms 8 having central openings 9 spacing these platforms 8 from the shaft 3. Alternating with these platforms 8 is a second series of platforms 10 carried by the shaft 3 and having clearance 11 as to the housing 1. The platforms 8 are stationary with the housing, and have the loose material supplied thereto agitated and progressed inwardly to flow over flanges 12, 13, at the central openings 9. The shaft 3 carries radial arms 14 upon which are mounted plows 15 adjusted to effect the desired agitation and travel of the material on the platforms 8 during rotation of the shaft 3. These arms 14 serve to support the movable series of platforms 10.

The stationary platforms 8 have about the central openings 9 depending collars 16 carrying radiating arms 17 for carrying plows adjusted to work the loose material on the movable platforms 10 therebelow outward to flow over dams or flow retarding flanges 18 to then fall through the openings 11 to the stationary platform below and then undergo further agitation with reverse radial progress, and be urged over flange 13, or 12, to fall into the opening upon cone 19 carried by the shaft 3, and to be scraped off said cone 19 by scraper 20 carried by the collar 16.

Each shaft-carried platform 10, with the housing carried platform 8 there below as herein disclosed may be a chamber, which chambers are superposed. Inasmuch as the hydrator is contructed for continuous treatment, as distinguished from batch operation, flow valves are provided between the chambers, effective for trapping a material blanketing gas in a chamber, or group thereof, and even building up the pressure of such blanketing. The character of the loose material is a factor in building up the pressure, as well as the rate of feed, the thickness thereof maintained on the platforms and the rate of progressing such material, not only as to the rotative speed of the shaft 3, but also as to the adjustment of the plows 15 as to angle, as well as whether any of the plows are adjusted to reverse flow. The flow valve between the chambers may be adjusted by set screws 21 for holding auxiliary collars 22 for clearance of the material if there is to be no pressure difference between the chambers spaced by such valve, and for extending into the material an extent which may preclude blowing of the material thereunder when the higher pressure chamber is above, and which will not cut off all flow when the higher pressure is in the chamber below.

The loose material, as fully or partially burned dolomite or limestone, may be supplied to the hydrator from above. Motor 23 actuates endless belt conveyor 24 for delivering at a uniform weight rate a supply of material from the hopper 25, to pass by way of screw conveyer 26 as a gas trapping supply passage into the upper chamber of the hydrator housing 1.

For efficient operation, the water supply for the hydration may be preheated. Eccentrically of the hydrator housing 1, and mounted thereon is a pair of stacks 27 as flues for taking off the moisture and dust laden gases from the hydrator. Carried by each of the stacks 27 as a water jacket is a tank 28. These tanks 28 are cross connected by pipe 29, so that water supply thereto from the line 30 as automatically controlled by float valve 31 may serve to maintain an established level in said tanks. Partial partition 32 in one of the tanks 28 serves to keep the float for the valve 31 from disturbance by the incoming water. The hot gases and fumes rising in the stacks 27 tend to warm the supply water. These tanks 28 accordingly are preheaters for the hydrator, inasmuch as the water is taken therefrom for acting upon the alkaline earth oxid carrying material for effecting the exothermic reactions therewith.

From the line 29 is drop line 33 to measuring device or pump 34 connected with the loose material supply control device. The conveyor 24 is driven from the motor 23 and additionally there is crank disk driving connection (Fig. 6) for actuating the pump 34. This insures proportional water volume for the added moisture requirements of the operations. In order that there may be no siphoning, and to avoid forcing which might be detrimental to operations, the water from the pump 34 passes by riser 35 to siphon breaking opening or vent 36. From below this opening 36, line 37 extends from the line 35 to discharge into funnel 38 connected to keep the bearing 4 running in liquid, as well as flush from it any grit, this moisture seeping into the top chamber of the hydrator to assist in the hydration. The main volume of the hydration moisture, however, passes by way of line 39 from the funnel 38 to coil 40 about the upper outer portion of the topmost chamber in the hydrator housing 1. This coil 40 may serve further to bring up the temperature of the water before it passes by coil 41 having downward perforations as a spray about the opening from the conveyor 26 to commingle with the supply of loose material being discharged upon the topmost platform 10.

As the material is fed outward and inward to be agitated over these platforms and progress downward, the slaking or hydration operations take place with resultant disintegration of the material supplied into a more or less fluffy product.

The speed of operation, and the character of the product is improved by holding the heat of reaction in a way to avoid burning. The steam generated by the reaction tends to work the air out of the hydrator. The flow valves and material volume may be adjusted for trapping off say the upper pair of platforms as the top chamber to have a steam blanket built up therein for the material being treated. The steam as so retained seems to be effective for more ready penetration into the material for quick and uniform disintegration. In addition to this steam or water vapor from the exothermic reaction with the material being treated, there is supplied herein live steam. To this end steam line 42 is provided with regulating valve 43 and cut off valve 44. With the valve 44 open, the steam supply line 42 may continuously deliver at a uniform rate by way of jet 43 steam into the trapped upper chamber of the hydrator housing 1. This live steam may be delivered in excess of the requirement of the material to build up pressure in the chamber beyond that of the material generated steam, but this pressure is preferably kept down so as not to effect blowing of the material past the blow valve, for such blasting across the movable platform of the chamber therebelow would tend to disturb the uniform progress and agitation operation of the hydrator.

The lowermost stationary platform 8 is provided with a central collar 46 through which may come a natural draft as supplied into the housing 1 by way of opening 47. The material as hydrated and coming to the lowermost platform 8, may pass therefrom by opening 48 to be delivered to screw conveyor 49 as driven by gearing 50 from the motor 5. This conveyor 49 discharges the treated material from the hydrator through opening 51.

The two upper chambers are shown as operable for building up and holding pressure. In the vertical series of five chambers as herein disclosed, the next two intermediate chambers are shown as having openings 52 into breeching 53 outside the housing 1 and out of line with the stacks 27. The lowermost chamber may be trapped to build up pressure, for over openings 52 therefrom into the breechings 53, are chutes or baffles 54 as inclined upper walls to breeching passages which may have the tops thereof closed by valves or dampers 55.

The breeching 53 is in communication with the stack 27 by opening 56 from which extends chute 57 for directing flue gas precipitation back into the breeching 53 toward baffles 58 from whence it may tumble to chute 54, and if adhering thereto, may be loosened by knocker 59 actuated against the underside thereof.

Condensation of the excessive moisture taken out with the dust laden gases is assisted, by allowing cooler outside air to enter by way of adjustable vent devices 60 in the breeching 53 to create eddies at the baffles 58.

Ways 61 are provided at the openings 52 for doors 62, which may be used for creating additional pressure chambers, The material as precipitated in the breeching, may be more or less moist, if not sloppy, and as falling upon the chute 54 is directed into the hydrator for agitation before passing down to the lowermost platform 8 for discharge from the hydrator. This treatment, of gettting back into the hot mass, tends to average the moisture and work off any excess.

The condensation of moisture in the stack to entrain dust is accelerated by the preheater tanks 28. While the expansion of the gases from the openings 52 into the breeching 53 has a cooling action and the baffles assist in providing eddy regions for further cooling as well as precipitation of dust, still dust and moisture get to the stack. Chute 63 from the opening 56 serves to direct precipitation as occurring in the stack, away from the precipitation as occurring in the breeching.

The stack precipitation as thus directed passes through openings 64 (Figs. 3, 4) in top 65 of the housing 1. One of the openings 64 is framed by flange 66 (Fig. 4) of plow carrying radial arm 67 fixed with the housing 1, 65. Mounted on this flange 66 is tube or pocket 68 (Fig. 4) extending down to just clear the surface of the top platform 10. This pocket 68 has diverging tapered side 69. These tapered walls 69 form a V-shaped opening in the bottom of the pocket 68 extending transversely of a radius from the shaft 3. This stationary V-shaped opening 70 has its wider end toward the direction from which the platform 10 is moved. The walls 69 accordingly spread the loose and freshly moistened material as supplied to the top-most platform 10, leaving a spill of the material following from this pocket 68. The widened after end of this pocket 68 as extending upwardly from the table is provided with a pair of parallel guide ways 71 (Fig. 4) in which may be vertically adjusted a gate or closure 72 to be held in any desired clearance as to the platform 10 by a set screw 73. Accordingly as the precipitate in the stack may be directly delivered to the hydrator, the gate 72 may be adjusted to maintain sealing, while the travel of the platform 10 may cause the pocket 68 as to its sides 69 to act as a plow to clear a way or path into which the precipitate may be delivered as deposited in the pocket and trimmed by the gate 72. This is a flow trapping valve or sealing shoe device permitting maintenance of pressure in the top hydrator chamber, while delivering the fines from the flue gases for thorough commingling with the material for treatment.

These are features contributing to uniformity of product, and in continuous operation at speed and volume of production or output have marked advantages as to installation expense.

What is claimed and it is desired to secure by Letters Patent is:—

1. In a hydration apparatus, a superposed series of chambers, agitators in said chambers, material flow valves trapping communication between the chambers, and a live steam supply to a valve trapped chamber.

2. In a hydration apparatus embodying a vertical cylindrical housing, superposed chambers in said housing, agitators effective to progress material through said chambers in sequence, material flow valves trapping communication between the chambers, a water supply and a live steam supply to a trapped chamber.

3. A hydrator comprising a housing, a central vertical shaft therein, a series of platforms carried by the housing, alternating with said housing carried platforms a series of shaft carried platforms, platform carried plows for agitating and progressing material on the platform below the platform carrying the plows, and depending collars from the housing carried platforms to extend into material on adjacent shaft carried platforms therebelow.

4. A vertical cylindrical hydrator housing, a series of superposed platforms carried by the housing, a shaft central of the housing, platforms alternating with the housing platforms and carried by said shaft, a platform of one of said series being provided with a depending collar toward a platform of the other series therebelow to extend into material on said lower platform, and means for adjusting said collar clearance as to the lower platform to regulate building up of pressure blanket for the material on one of said platforms during the progress of material past said collar as a flow valve.

5. A hydrator embodying superposed platforms, means isolating the platforms in pairs to form chambers, a stack, and means between a lower chamber and the stack for regulating pressure in said lower chamber.

6. A hydrator embodying two vertical series of platforms, one series alternating with the other, means isolating two platforms as one of each series to form a chamber, a stack, breeching between a lower chamber and the stack, and a valve in the breeching adjustable to build up pressure in said lower chamber.

7. A superposed platform multi-chamber hydrator, a stack therefor, a breeching between the stack and a hydrator chamber for receiving moisture and dust laden gases from the chamber, stack chilling means for condensing the moisture for entraining and precipitating the dust and a receiver for the precipitated dust connected for discharge back to the hydrator, 8. A hydrator embodying two series of superposed platforms, the platforms of one series alternating with those of the other series, a stack for the hydrator for receiving moisture and dust laden gases from the hydrator, chilling means for condensing the moisture for entraining and precipitating the dust, and a deflector for directing the precipitated dust back into the hydrator.

9. A hydrator embodying two series of platforms alternating to form pairs as superposed chambers, a stack for receiving moisture and dust laden gases from the hydrator, stack chilling means for condensing the moisture for entraining and precipitating the dust, and a valve for delivering the precipitated dust into a hydrator chamber.

10. A hydrator provided with a stack, a feed water tank about said stack, a material supply control for the hydrator, and a water measuring feeder for the hydrator operated by said supply control for taking water from said tank and delivering directly to the hydrator proportionately to said material supply delivery.

11. A hydrator, a stack out of direct gas supply communication with the hydrator and provided with direct dust delivery communication with the hydrator, and a breeching between the hydrator and stack for gases from the hydrator.

12. A hydrator, a stack thereover, a breeching offset from the hydrator and stack providing indirect communication from the hydrator to said stack, and a discharge from the breeching to the hydrator.

13. A cylindrical hydrator, a stack eccentric of the hydrator and thereover, a breeching providing communication from the hydrator to said stack, an eddy providing baffle in the breeching, said breeching having a dust precipitation section for receiving baffle eddy accumulated dust from the hydrator, and a controllable discharge way from said precipitation section to the hydrator.

14. A vertical cylindrical hydrator, a breeching laterally thereof, a stack with which the breeching is in communication, an eddy providing baffle in the breeching for receiving dust from dust laden gases from the hydrator, and a knocker for jarring dust accumulation from the baffle to flow back into the hydrator.

15. A hydrator, a breeching therefrom, a stack laterally offset from said breeching to which said breeching delivers, first precipitation-collection-disposal means between the breeching and hydrator, and independent second precipitation-collection-disposal means between the stack and hydrator.

In witness whereof I affix my signature.

JOHN C. SCHAFFER.